US00RE50336E

(19) United States
(12) Reissued Patent
Fazio et al.

(10) Patent Number: US RE50,336 E
(45) Date of Reissued Patent: Mar. 18, 2025

(54) WHEEL ROLLER HAVING A LOG CHAIN FORGING OR A CARRIER LINK FORGING FOR AN 88 SERIES CHAIN

(71) Applicants: Paul Fazio, Plantation, FL (US); Anthony Analetto, Weston, FL (US)

(72) Inventors: Paul Fazio, Plantation, FL (US); Anthony Analetto, Weston, FL (US)

(73) Assignee: Sonny's Enterprises, LLC, Tamarac, FL (US)

(21) Appl. No.: 18/397,319

(22) Filed: Dec. 27, 2023

Related U.S. Patent Documents

Reissue of:
(64) Patent No.: 10,766,707
Issued: Sep. 8, 2020
Appl. No.: 16/418,212
Filed: May 21, 2019

U.S. Applications:
(60) Provisional application No. 62/680,012, filed on Jun. 4, 2018.

(51) Int. Cl.

| | |
|---|---|
| ***B65G 17/24*** | (2006.01) |
| ***B65G 17/08*** | (2006.01) |
| ***B65G 17/40*** | (2006.01) |
| ***B65G 19/22*** | (2006.01) |
| ***B65G 39/20*** | (2006.01) |

(52) U.S. Cl.
CPC ..... *B65G 17/24* (2013.01); *B65G 17/08* (2013.01); *B65G 17/40* (2013.01); *B65G 19/225* (2013.01); *B65G 39/20* (2013.01); *B65G 2201/0294* (2013.01)

(58) Field of Classification Search
CPC ..... B65G 17/08; B65G 17/40; B65G 17/24; B65G 17/061; B65G 19/225; B65G 2201/0294; B65G 39/20; B60S 3/004
See application file for complete search history.

(56) References Cited

U.S. PATENT DOCUMENTS

| | | | | |
|---|---|---|---|---|
| 3,260,219 | A * | 7/1966 | Vani | B60S 3/004 105/27 |
| 3,596,605 | A * | 8/1971 | Shelstad | B60S 3/004 104/176 |
| 4,194,449 | A | 3/1980 | Breau | |
| 4,690,065 | A * | 9/1987 | Belanger | B60S 3/004 104/196 |
| 5,001,988 | A * | 3/1991 | Agathos | B60S 3/004 104/172.3 |
| 6,647,894 | B1 * | 11/2003 | Simoes | B60S 3/004 104/172.1 |
| 6,668,731 | B2 | 12/2003 | Calisi et al. | |
| 8,113,124 | B2 * | 2/2012 | Smock | B61B 10/04 104/162 |
| 8,393,461 | B2 * | 3/2013 | Balash | B60S 3/004 104/172.3 |

(Continued)

*Primary Examiner* — Matthew J Kasztejna
(74) *Attorney, Agent, or Firm* — Laurence A. Greenberg; Werner H. Stemer; Ralph E. Locher

(57) ABSTRACT

A wheel roller for a chain conveyor of an automated carwash has a more robust configuration due to a direction connection of the wheels to the carrier link. The wheel roller contains a carrier link forging having a main body with a carrier link formed as an unitary component, pins secured to the main body in a fixed, non-pivotable manner, and wheels attached to the pins.

23 Claims, 7 Drawing Sheets

(56) References Cited

U.S. PATENT DOCUMENTS

| | | | | |
|---|---|---|---|---|
| 9,452,740 | B1 | 9/2016 | Fazio et al. | |
| 2003/0200892 | A1* | 10/2003 | Calisi | B60S 3/004 104/172.3 |
| 2007/0284223 | A1* | 12/2007 | Belanger | B60S 3/004 198/618 |
| 2008/0229965 | A1* | 9/2008 | Balash | B60S 3/004 104/162 |
| 2011/0036263 | A1 | 2/2011 | Balash | |

* cited by examiner

WHEEL ROLLER HAVING A LOG CHAIN FORGING OR A CARRIER LINK FORGING FOR AN 88 SERIES CHAIN

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION

This application claims the priority, under 35 U.S.C. § 119, of provisional application No. 62/680,012, filed Jun. 4, 2018; the prior application is herewith incorporated by reference in its entirety.

BACKGROUND OF THE INVENTION

Field of the Invention

The invention relates to a wheel roller having a log chain forging or a carrier link forging for an 88 series chain for forming a conveyor roller assembly for moving vehicles through an automated carwash.

Known roller assemblies generally comprise a long bent bar that has a first end for carrying the rollers and a second end carrying a carrier link for attaching into a chain of a conveyor. The long bent bar and the related carrier link are subject to excessive wear and tear during operation and are subject to high failure rates. There is a need in the market place for a roller assembly that is more robust and thus has a reduced amount of wear points subject to failure.

SUMMARY OF THE INVENTION

It is accordingly an object of the invention to provide a wheel roller having a log chain forging or an carrier link forging for an 88 series chain that overcomes the above-mentioned disadvantages of the prior art devices and is more robust in design and has a longer service life between failures.

With the foregoing and other objects in view there is provided, in accordance with the invention, a wheel roller. The wheel roller contains a carrier link forging which has a main body and a carrier link formed as a unitary component. The carrier link has a front end and a rear end and is disposed below the main body. The main body has openings that extend completely through the main body. Pins are disposed in the openings in the main body and are fixed to the main body in a non-pivotable manner. Wheels are supported on the pins.

In accordance with an added feature of the invention, the main body has two openings formed in the main body and one of the pins is disposed in each of the openings.

In accordance with a further feature of the invention, the carrier link forging has a sub-body disposed directly below the main body and above the carrier link, the sub-body is formed as a part of the unitary component.

In accordance with an additional feature of the invention, the main body has a top surface with sides and the sides overlap the sub-body. Ideally, the sides of the top surface have a reinforcement which extends down over sides of the sub-body and the openings run completely through the reinforcement and the sub-body. The reinforcements each have two circular sub-reinforcement parts in which the openings are formed.

In accordance with another feature of the invention, the carrier link forging has a center of gravity disposed directly above the carrier link.

In accordance with a further additional feature of the invention, the main body has a front end extending past the front end of the carrier link and a rear end extending past the rear end of the carrier link.

In accordance with a further added feature of the invention, the carrier link has:

a) two spaced apart legs with openings and each leg has a front end and a rear end;

b) a link connecting housing having end sides, the link connecting housing is disposed between inner sides of the legs and each of the end sides are respectively connected to the rear end of one of the legs; and c) the front end of the legs together define a pocket for receiving a rear end of an adjacent carrier link.

In accordance with a concomitant feature of the invention, horizontal webs connect the legs of the carrier link to the sub-body.

With the foregoing and other objects in view there is further provided, in accordance with the invention, a wheel roller. The wheel roller contains a carrier link forging which has a main body and a carrier link formed as a unitary component. The carrier link has a front end, a rear end, and a bottom and is disposed directly below the main body. The bottom of the carrier link is C-shaped with two opposing arms having a gap formed between the arms for linking to another carrier link forging. The main body has openings formed therein and extending completely through the main body. Pins are disposed in the openings and secured to the main body in a fixed, non-pivotable manner and wheels are supported by the pins.

In accordance with an added feature of the invention, the main body has an underside with a recessed pocket formed therein for receiving the carrier link.

In accordance with a further feature of the invention, the main body has sides which overlap and extend along sides of the carrier link. Each of the sides of the main body has a front circular shaped reinforcement and a rear circular reinforcement. The front and rear circular shaped reinforcements have the openings running completely through the front and rear circular shaped reinforcements. The front and rear circular shaped reinforcements are each directly disposed above one of the arms of the carrier link.

In accordance with another feature of the invention, the carrier link forging has a center of gravity disposed directly above the carrier link.

In accordance with an additional feature of the invention, the carrier link has a first length L1, the main body has a second length L2, and a ratio of L2/L1 is less than 1.5.

In accordance with a concomitant feature of the invention, the carrier link has a first longitudinal extent, the main body has a second longitudinal extent, and the carrier link is disposed below the main body and the first longitudinal extent does not exceed boundaries of the second longitudinal extent and is within the boundaries of the second longitudinal extent.

Other features which are considered as characteristic for the invention are set forth in the appended claims.

Although the invention is illustrated and described herein as embodied in a wheel roller having a log chain forging or a carrier link forging for an 88 series chain, it is nevertheless, not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
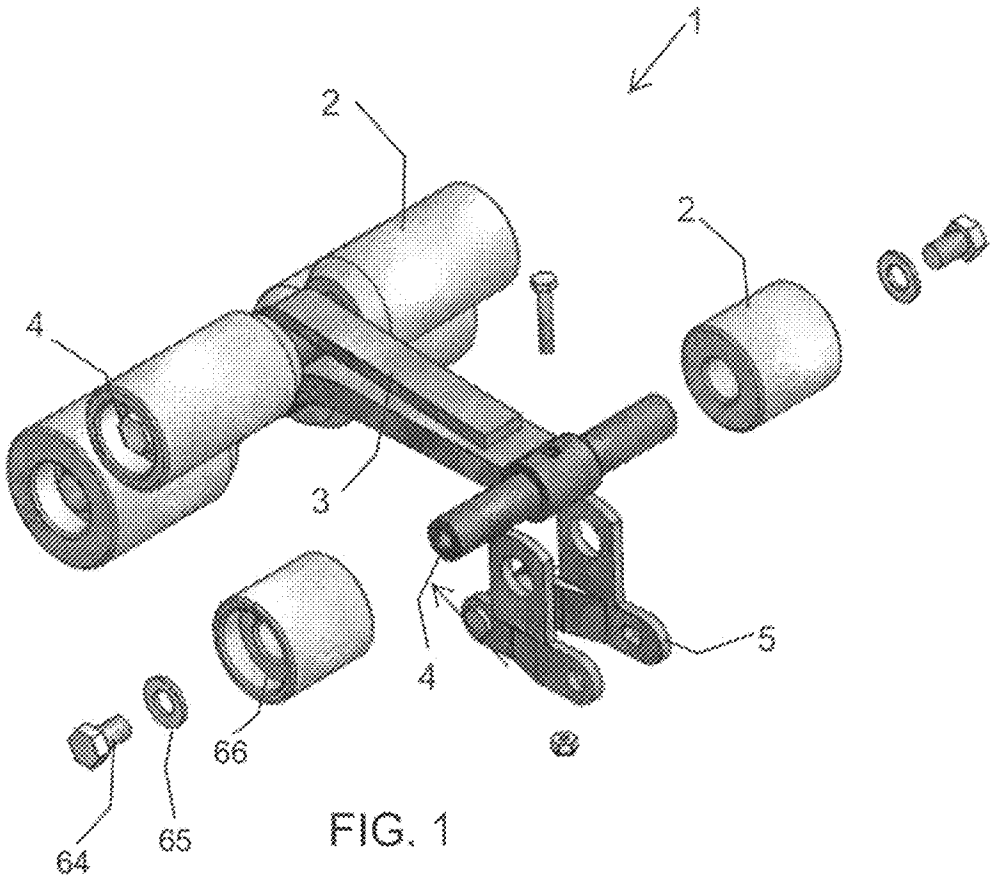
FIG. 1 PRIOR ART
FIG. 1 is a diagrammatic, partially exploded, perspective view of a wheel roller according to the prior art.

Referring now to the figures of the drawings in detail and first, particularly to FIG. 1 thereof, there is shown a known prior art wheel roller 1. The wheel roller 1 has wheels 2 supported on a wheel frame 3 having pins 4 for holding the wheels 2. At a front end, a carrier link 5 is attached to one of the pins 4 supporting its respective wheels 2. As can be seen in FIG. 1, the wheels 2 are held on the pins 4 by a bolt or screw 64 and washer 65 combination housed in a recess 66 formed in the wheels 2.

Figure 2:
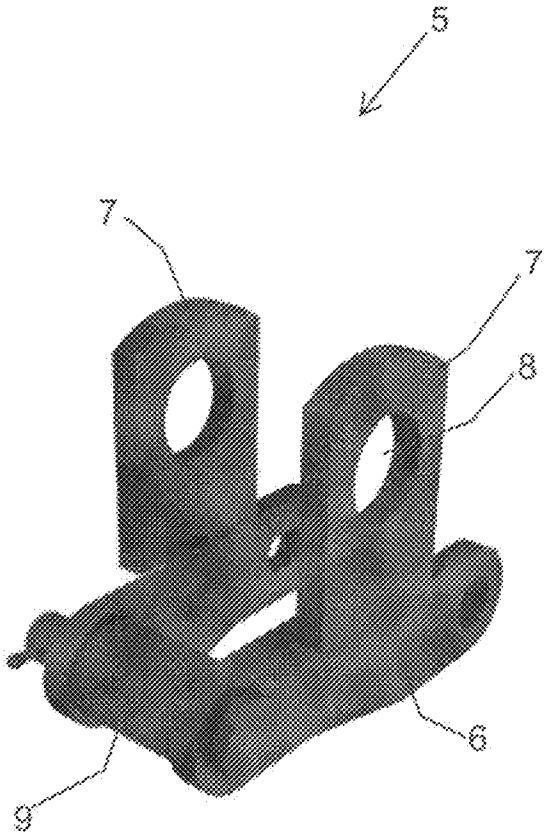
FIG. 2 PRIOR ART
FIG. 2 is a diagrammatic, perspective view of a carrier link used in the wheel roller shown in FIG. 1 according to the prior art.

FIG. 2 shows a perspective view of the carrier link 5. The carrier link 5 is formed of two horizontally extending arms or links 6, two vertically extending ears 7 with openings 8 for receiving one of the pins 4, and a link connecting pin 9 connecting the arms 6. A chain is formed from a plurality of carrier links 5 (without the ears 7) being connected together by the respective link connecting pins 9. Within the chain every $X^{th}$ carrier link 5 (e.g. 8, 10, 12, $16^{th}$ link), for example, is formed as the wheel roller 1. Thus a chain is formed carrying a plurality of spaced apart wheel rollers 1. Unfortunately, the ears 7 are subject to high wear and tear resulting in a high incident of failure due to the fact that the wheels 2 and the wheel frame 3 can pivot about the forward or frontal pin 4 connected to the carrier link 5 thus stressing the ears 7 (e.g. the rear wheels 4 pivot about the front wheels 4 stressing the ears 7 of the carrier link 5). In addition, the elongated wheel frame 3 is also susceptible to a higher rate of failure than desired due to its elongated construction and the stresses formed along the elongated wheel frame 3.

Furthermore, the elongated wheel frame 3 and the carrier link 5 are formed as separate components which increase costs and construction complexity.

Figure 3:
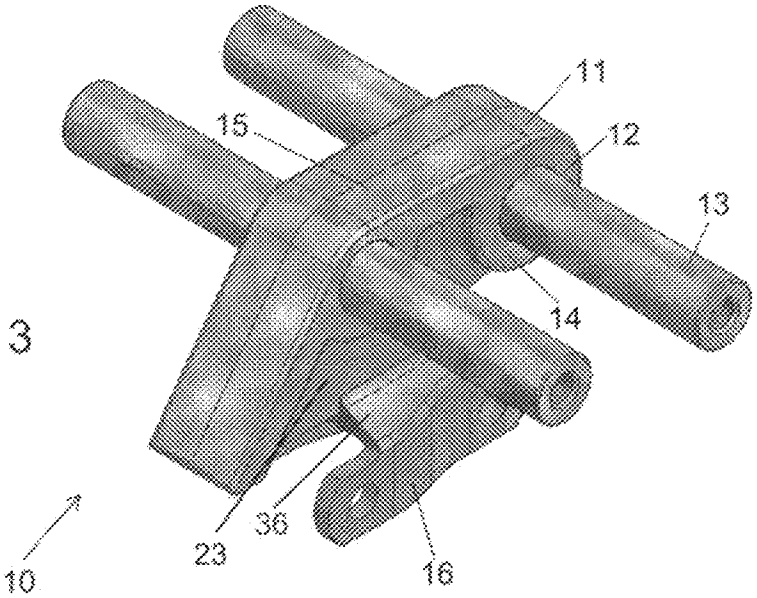
FIG. 3 is a diagrammatic, perspective view of a carrier link forging for an 88 series chain.
Figure 6:
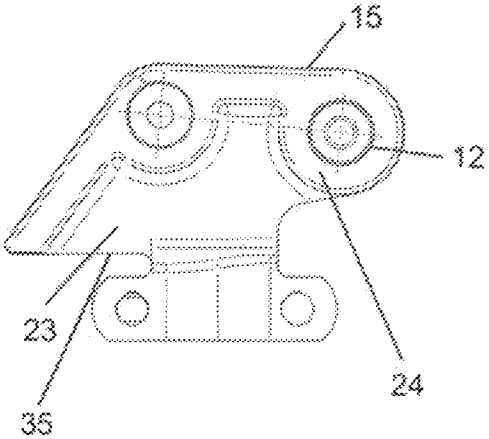
FIG. 6 is a side view of the carrier link forging for the 88 series chain.
Figure 4:
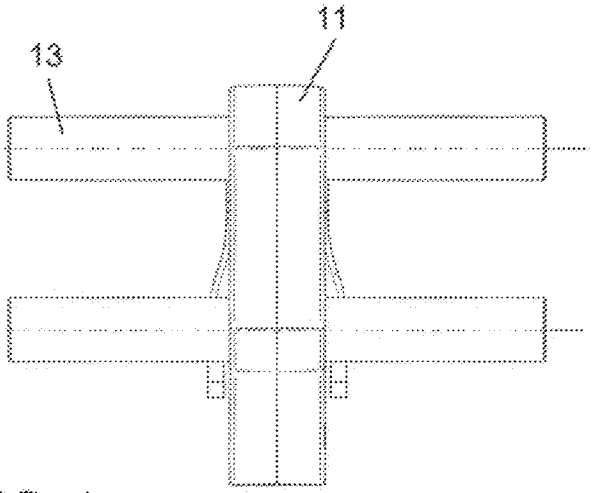
FIG. 4 is a top plan view of the carrier link forging for the 88 series chain.
Figure 5:
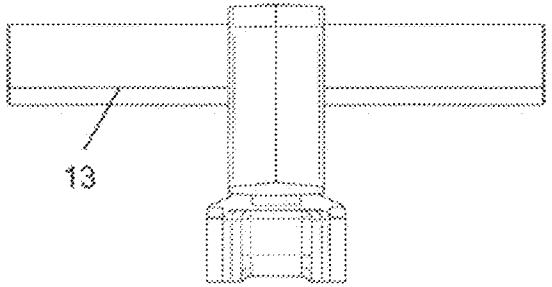
FIG. 5 is a front view of the carrier link forging for the 88 series chain.
Figure 14:
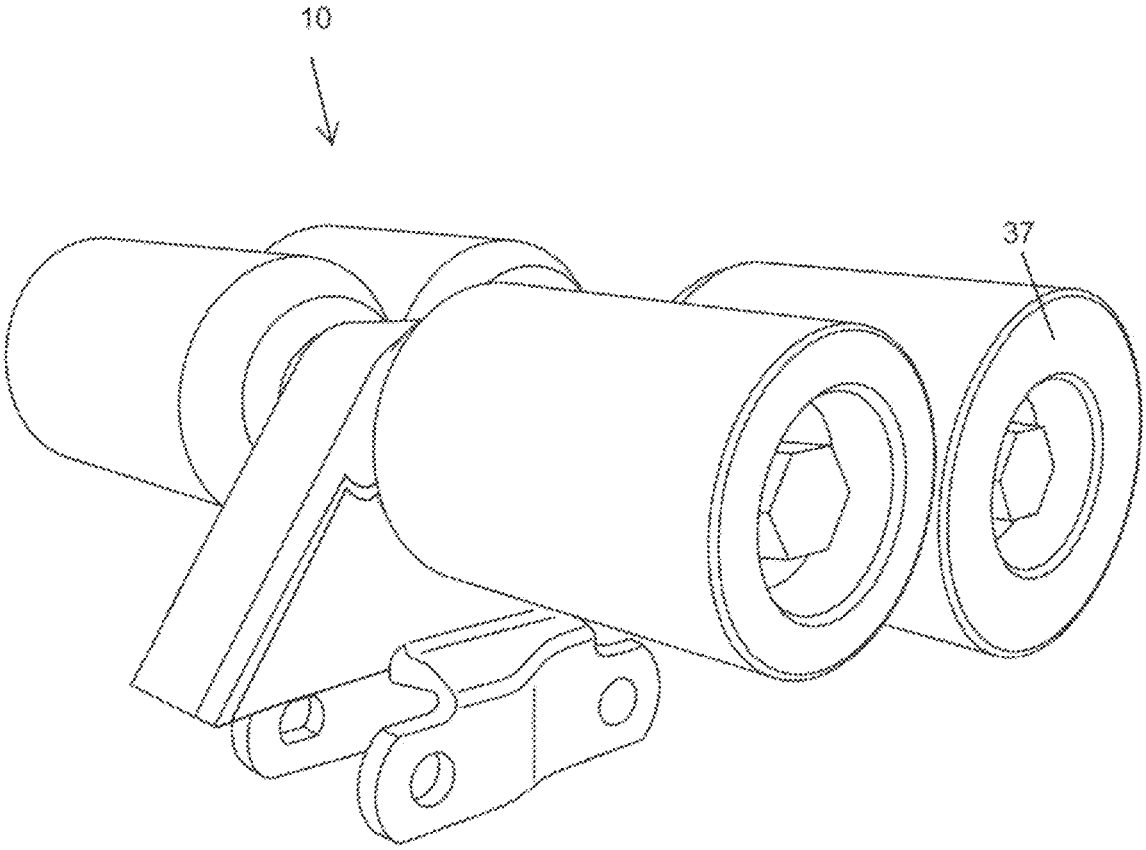
FIG. 14 is a perspective view of the wheel roller having wheels attached.

FIGS. 3-14 show a design of a carrier link forging 10 for an 88 series chain according to the invention which combines the functions of the prior art carrier link and wheel frame in a single integrated or unitary unit. As shown in FIG. 3, the carrier link forging 10 has a main body 11 with two openings 12 formed in a reinforcement or overlapping part 14 of the main body 11. The main body 11 resides on top of a sub-body 23. As shown best in FIG. 7, the reinforcement or overlapping part 14 is formed with a flange 25 which buts against sides 30 of the sub-body 23 (see FIG. 7). Pins 13 are inserted in the openings 12 and are secured (e.g. welded) to the reinforcement or overlapping part 14 of the main body 11. The pins 13 receive the wheels 37 as shown in FIG. 14.

The main body 11 has a top brace plate 15 which overlaps the sub-body 23 on its sides 30 and forms the area of the reinforcement and overlapping part 14 in which the openings 12 are formed. Sides 26 of the reinforcement and overlapping part 14 in a top region have a rear circular shaped reinforcement 31, a front circular shaped reinforcement 32, and a generally rectangular connecting bar 33 which connects the front and rear circular shaped reinforcements 31, 32 to each other. Extending downward from the front circular shaped reinforcement 32 is an obliquely extending rectangular connecting bar 34. The parts 14, 15, 31, 32, 33, 34 form a pocket or recess into which the sub-body 23 resides in a form-fitting manner with the main body 11.

Figure 11:
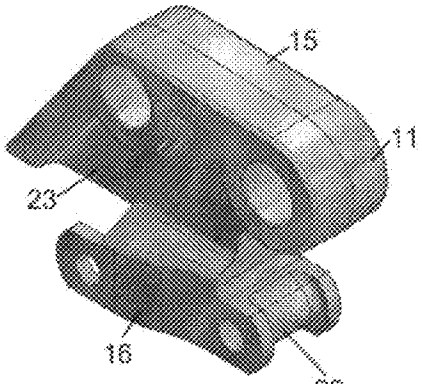
FIG. 11 is another perspective view of the carrier link forging.
Figure 12:
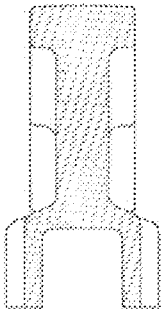
FIG. 12 is a sectional view of the carrier link forging taken along the line XII-XII shown in FIG. 13.
Figure 10:
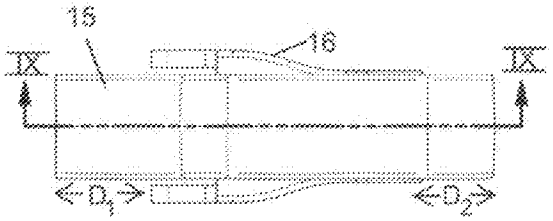
FIG. 10 is a top view of the carrier link forging.
Figure 13:
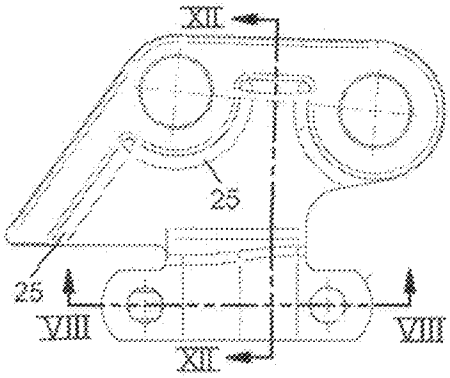
FIG. 13 is a side view of the carrier link forging.
Figure 7:
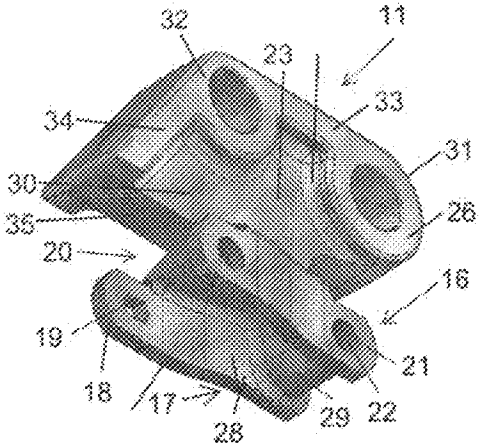
FIG. 7 is a perspective view of the carrier link forging for the 88 series chain.

A carrier link 16 is connected to a bottom 35 of the sub-body 23. At this point we stress that the main body 11, the sub-body 23 and the carrier link 16 are ideally formed as a forged unitary piece as best shown in FIGS. 7 and 11. In the alternative, the pieces 11, 16 and 23 can be welded to each other but better structural strength and more efficient production is provided by a forged unitary piece. The main body 11, the sub-body 23 and the carrier link 16 are preferably manufactured out of a metal and is case hardened.

The carrier link 16 is formed so that it can connect with another carrier link 16 and thus form a conveyor chain. A link or arm section 17 has front legs 18 each with an opening 19. The front legs 18 are spaced apart for providing a pocket 20 for receiving rear legs 21 of an adjacent carrier link 16.

The rear legs 21 also have openings 22 for receiving a non-illustrated pin for connecting adjacent carrier links 16 to each other. As can be clearly seen, the rear legs 21 are disposed closer together than the front legs 18 so that they may be nestled in the pocket 20 of a neighboring carrier link 16.

The link section 17 further has a first middle section 27 followed by a second middle section 28. As seen best in FIGS. 7 and 8, the first and second middle sections 27, 28 are tapering (angled) parts such that the first and second middle sections 27, 28 taper inward towards the rear legs 21. Between the rear legs 21 is a link connecting housing 29 in which an opening 22 traverses there-through for receiving a connecting pin.

Wings or horizontal webs 36 connect the sub-body 23 to the carrier link 16.

With such a carrier link forging 10, the rear wheels 37 held in the rear circular shaped reinforcement 31 cannot pivot about the front wheels 37 held in the front circular shaped reinforcement 32 of the carrier link 16 as the carrier link forging 10 is a unitary part either by casting or welding. Due to the integrated design, less operational stress and thus less wear and tear is experienced by the carrier link forging 10. Therefore, the carrier link forging 10 is more robust than that of the prior art wheel roller 1. More specifically, there is no elongated body 3 that is connected to the ears 7 of the carrier link 5 as shown in FIG. 1. Rather the ears 7 are eliminated or replaced by the more robust main body 11.

Figure 9:
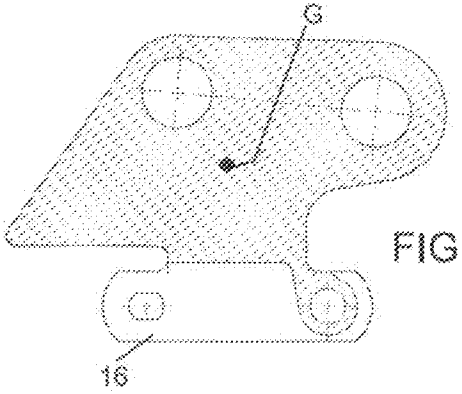
FIG. 9 is a sectional view of the carrier link forging taken along the line IX-IX shown in FIG. 10.
Figure 8:
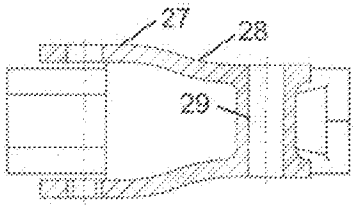
FIG. 8 is a bottom, sectional view of the carrier link forging for the 88 series chain taken along the line VIII-VIII shown in FIG. 13.

As shown best in FIG. 9, a center of gravity G of the carrier link forging 10 is directly over the carrier link 16 and any forces experienced by the wheels 37 is transmitted to the whole carrier linking forging 10 and not to a vulnerable part such as the ears 7 or the wheel frame 3 as shown in FIG. 1. The robustness of the carrier link forging 10 is further enhanced by the fact that the main body 11 extends past a front of the carrier link 16 by a distance D1 (see FIG. 10) and a rear of the carrier link by a distance D2. Therefore there is no lever action stressing of the carrier link 16 by the main body 11 as exists in the prior art shown in FIG. 1.

In essence, the elongated roller support frame 3, as shown in FIG. 1, is replaced by a more compact part configuration of the carrier link forging 10 of the instant application which is more robust and subject to less failures than carrier link forgings known in the prior art.

FIGS. 7-14 show additional views of the main body 11 with or without the pins 13 and the wheels 37 connected thereto.

Figure 15:
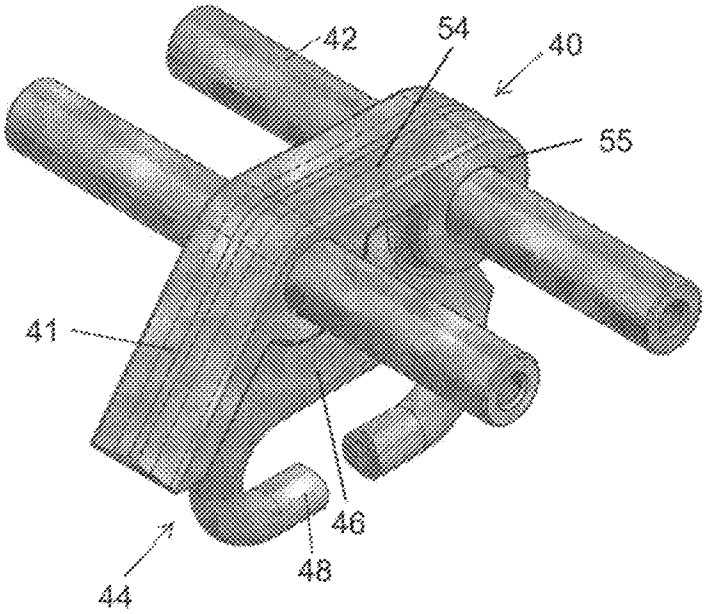
FIG. 15 is a perspective view of a wheel frame of a log chain wheel roller according to a second embodiment of the invention.
Figure 16:
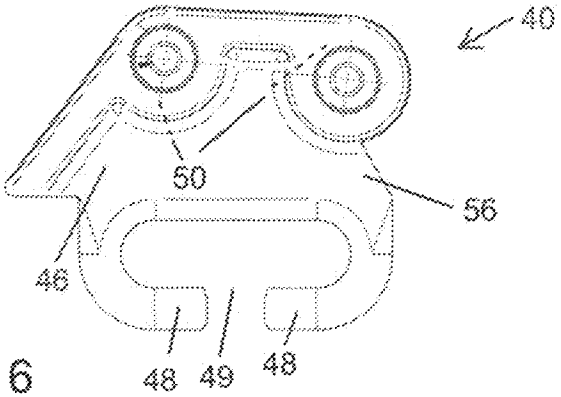
FIG. 16 is a side view of the wheel frame of the log chain wheel roller.
Figure 17:
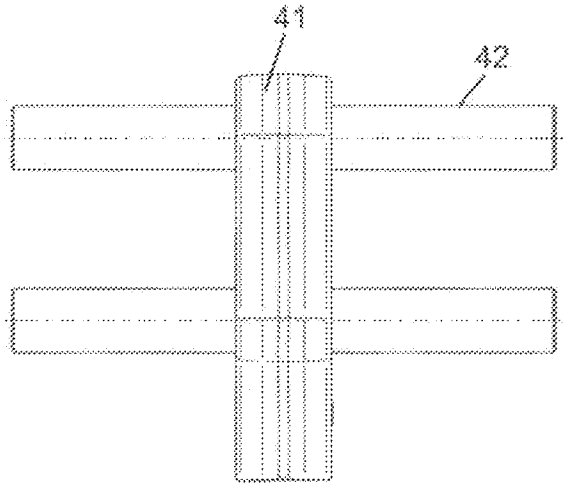
FIG. 17 is a top view of the wheel frame of the log chain wheel roller.
Figure 18:
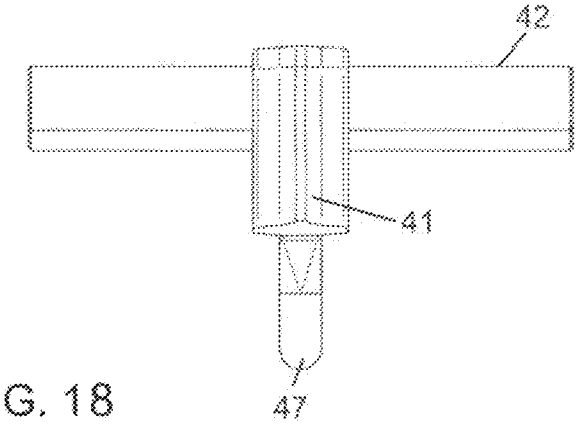
FIG. 18 is a front view of the wheel frame of the log chain wheel roller.
Figure 19:
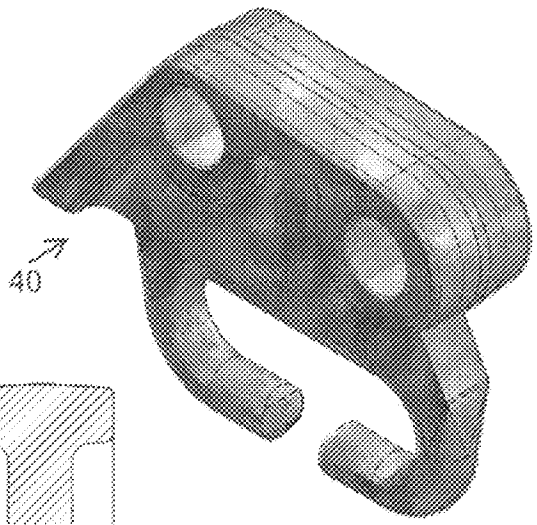
FIG. 19 is a perspective view of the wheel frame of the log chain wheel roller without pins.
Figure 20:
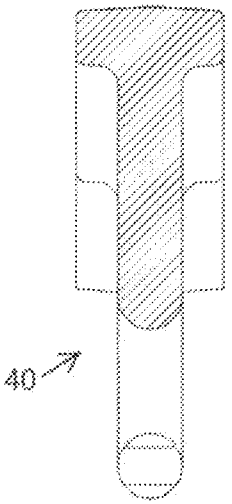
FIG. 20 is a sectional view of the wheel frame of the log chain wheel roller without the pins taken along the line XX-XX shown in FIG. 21.

FIGS. 15-22 shows a second type of wheel roller assembly which is known in the art as a log chain wheel roller 40 (see FIG. 15). The inventive design has been tested under tensile load surpassing open log chain link standards. The log-chain wheel roller assembly 40 has a wheel frame 41 and pins 42 for holding rollers or wheels 43 (see FIG. 22). A sub-body 46 is disposed beneath the wheel frame 41 and a lower part of the sub-body 46 forms a carrier link 44. The carrier link 44 is C-shaped and has two arms 48 with a gap 49 disposed between the opposing arms 48 (see FIG. 16).

Ideally the wheel frame 41 and the sub-body 46 are formed as a unitary part such as by casting. Alternatively, the wheel frame 41 and the sub-body 46 can be welded to each other where the sub-body 46 form fits into a pocket 50 formed in a bottom region of the wheel frame 41.

An object of the second embodiment is to reduce wear and extend the life of both the wheel rollers 40 and the carrier link 44. The object is achieved in that the wheel frame 41 and the carrier link 44 are formed as a unitary part and are forged out of a metal alloy and is case hardened. The selected alloy and hardness are specifically configured to properly match the properties of most log chains in the market and therefore reduces wear and extends the life of both the rollers and the connecting chain links. The forging process allows for a consistent material, which is a key factor in life expectancy and performance of the carrier link 44.

In the alternative, the forged wheel frame 41 with the carrier link 44 could be constructed using welding technology where it would have been composed of two welded pieces 41, 46 rather than being forged as a single piece unit. We note at this point that the wheel frame 41 and the sub-body 46 lead directly into each other with no space or gap formed between the components.

Figure 21:
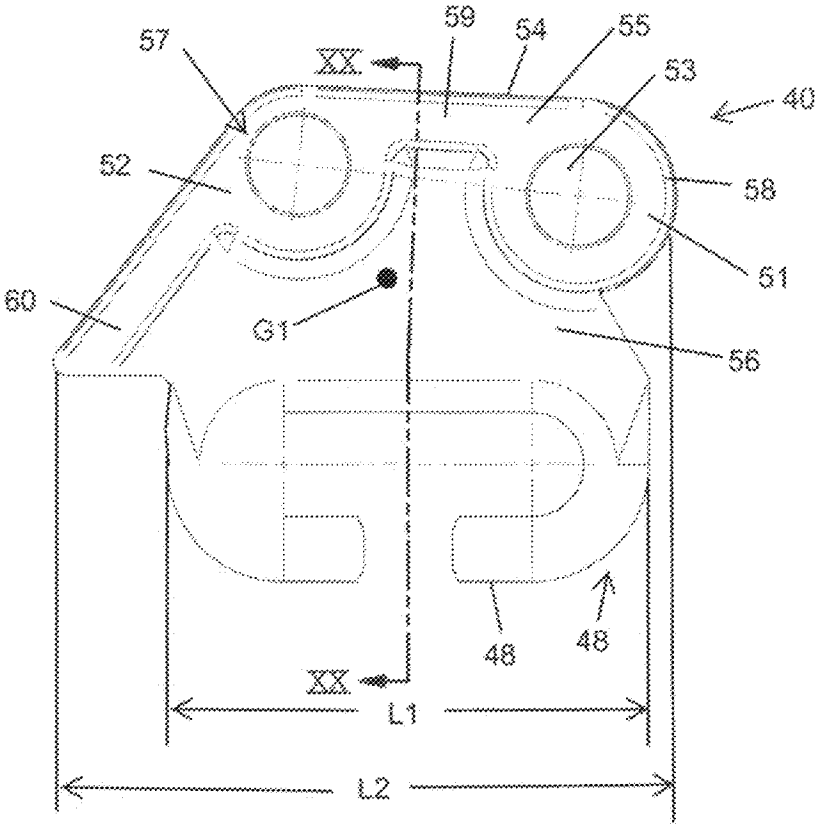
FIG. 21 is a side view of the wheel frame of the log chain wheel roller without the pins.
Figure 22:
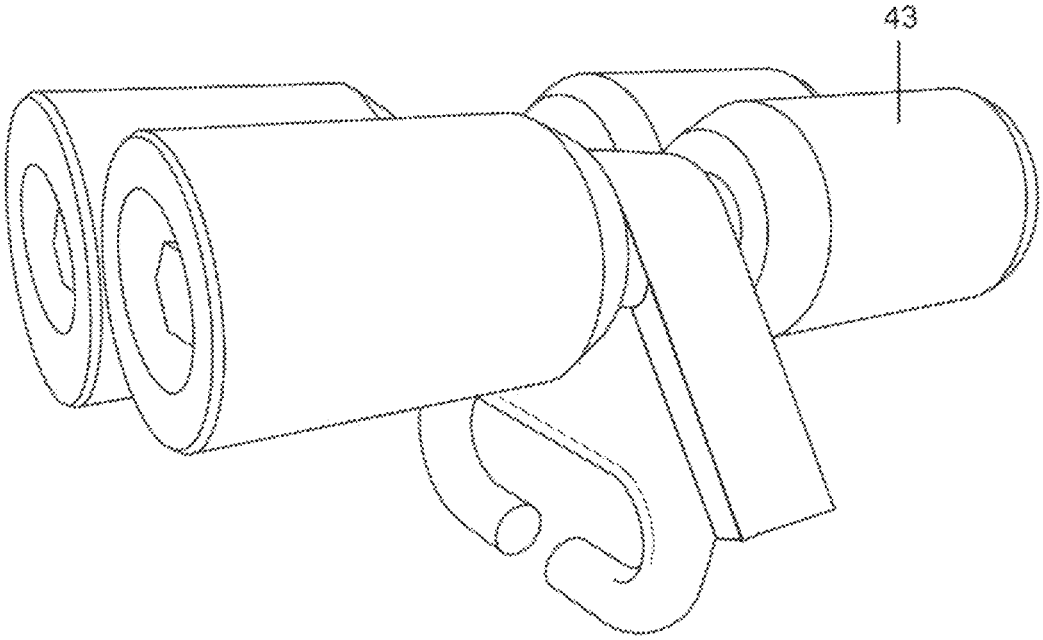
FIG. 22 is a perspective view of the wheel frame of the log chain wheel roller with wheels.

In addition the log chain wheel roller 40 has a center of gravity G1 also disposed directly above the carrier link 44 (see FIG. 21). As the pins 42 are directly above the carrier link 44, when the pins 42 are stressed the force stressing the pins 42 is absorbed by the stout combination of the wheel frame 41 and the sub-body 46 (no twisting of the ears 7 as shown in FIG. 1). In addition the wheel frame 41 and the sub-body 46 do not act like a lever transmitting the stress from the pins 42 to the carrier link 44 (compare FIG. 1 where the main frame 3 does act like a lever transmitting the stress to the ears 7).

The forged wheel frame 41 has a top plate 54 which on its sides 55 overlaps the sub-body 46 on its sides 56 and forms a reinforcement and overlapping part 57 in which openings 53 are formed. Sides 58 of the reinforcement and overlapping part 57 have a rear circular shaped reinforcement 51, a front circular shaped reinforcement 52, and a generally rectangular connecting bar 59 connecting the front and rear circular shaped reinforcements 51, 52 to each other. Extending downward from the front circular shaped reinforcement 52 is an obliquely extending rectangular bar 60. The parts 51, 52, 54, 57, 59, 60 form the pocket or recess 50 into which the sub-body 46 resides in a form-fitting manner with the forged wheel frame 41. Additionally, the front and rear circular shaped reinforcements 51, 52 are each directly disposed above one of the arms 48 of the carrier link 44.

As shown in FIG. 21, the carrier link 44 has a length L1 which ideally is approximately 124 mm. The wheel frame 41 has a length L2 which ideally is approximately 161 mm. What is of significance is that the length L1 of the carrier link 44 is totally within the length L2 of the wheel frame 41. We further note that a ratio of L2/L1 is less than 1.5 and is ideally 1.3 but can be in a range of 1.1-2.0.

The invention claimed is:

1. A wheel roller, comprising:

a carrier link forging having a main body and a carrier link formed as a unitary component, said carrier link having a front end and a rear end and disposed below said main body, said main body having openings formed therein and extending completely through said main body, said main body having a front end extending past said front end of said carrier link and a rear end extending past said rear end of said carrier link, *said carrier link being formed to connect to an adjacent carrier link and forming part of a conveyor chain, said carrier link being C-shaped with two opposing arms having a gap formed between said arms*;

pins disposed in said openings in said main body and fixed to said main body in a non-pivotable manner; and wheels supported by said pins *and said wheels disposed on opposing sides of said main body*.

2. The wheel roller according to claim 1, wherein said main body has two said openings formed therein and one of said pins is disposed in each of said openings.

3. The wheel roller according to claim 2, wherein said carrier link forging has a sub-body disposed directly below said main body and above said carrier link, said sub-body is formed as a part of said unitary component.

4. The wheel roller according to claim 1, wherein said carrier link forging has a center of gravity disposed directly above said carrier link.

5. A wheel roller, comprising:

a carrier link forging having a main body and a carrier link formed as a unitary component, said carrier link having a front end and a rear end and disposed below said main body, said main body having two openings formed therein and extending completely through said main body, said carrier link forging further having a sub-body disposed directly below said main body and above said carrier link, said sub-body is formed as a part of said unitary component, wherein said main body having a top surface with sides and said sides overlap said sub-body;

pins, one of said pins disposed in each of said openings in said main body and fixed to said main body in a non-pivotable manner, *a first reinforcement surrounding a first of said openings and a second reinforcement surrounding a second of said openings, said first reinforcement being separated from said second reinforcement by a portion of said sub-body*; and wheels supported by said pins.

6. The wheel roller according to claim 5, wherein said sides of said top surface each have [a reinforcement] *said first and second reinforcements* which [extends] *extend* down over sides of said sub-body *and said first and second reinforcements directly contact said sub-body*.

7. The wheel roller according to claim 6, wherein said openings run completely through said [reinforcement] *first and second reinforcements* and said sub-body.

[8. The wheel roller according to claim 6, wherein said reinforcements each have two circular sub-reinforcement parts in which said openings are formed.]

9. A wheel roller, comprising:

a carrier link forging having a main body and a carrier link formed as a unitary component, said carrier link having a front end, a rear end, and a bottom and is disposed directly below said main body, said bottom of said carrier link being C-shaped with two opposing arms having a gap formed between said arms for linking to another *carrier link of another* carrier link forging *and forming part of a conveyor chain*, said main body having openings formed therein and extending completely through said main body;

pins disposed in said openings and secured to said main body in a fixed, non-pivotable manner;

wheels supported by said pins;

said carrier link having a first longitudinal extent;

said main body having a second longitudinal extent; and said carrier link is disposed below said main body and the first longitudinal extent does not exceed boundaries of the second longitudinal extent and is within the boundaries of the second longitudinal extent.

10. A wheel roller, comprising:

a carrier link forging having a *single* main body and a carrier link formed as a unitary component, said carrier link having a front end and a rear end and disposed below said *single* main body, said *single* main body having openings formed therein and extending completely through said *single* main body;

pins disposed in said openings in said *single* main body and fixed to said *single* main body in a non-pivotable manner;

wheels supported by said pins;

said carrier link further containing:

two spaced apart legs with openings formed therein and each having a front end and a rear end, *said two spaced apart legs are both supported by said single main body*;

a link connecting housing having end sides, said link connecting housing disposed between inner sides of said legs and each of said end sides respectively connected to said rear end of one of said legs; and said front end of said legs together defining a pocket for receiving a rear end of an adjacent carrier link.

11. The wheel roller according to claim 10, further comprising horizontal webs connected between one of said legs and said sub-body.

[12. A wheel roller, comprising:

a carrier link forging having a main body and a carrier link formed as a unitary component, said carrier link having a front end, a rear end, and a bottom and is disposed directly below said main body, said bottom of said carrier link being C-shaped with two opposing arms having a gap formed between said arms for linking to another carrier link forging, said main body having openings formed therein and extending completely through said main body, said main body having an underside with a recessed pocket formed therein for receiving said carrier link;

pins disposed in said openings and secured to said main body in a fixed, non-pivotable manner; and wheels supported by said pins.]

13. The wheel roller according to claim [12] *1*, wherein:

said carrier link has a first length L1, said main body has a second length L2;

wherein a ratio of L2/L1 is less than 1.5.

14. The wheel roller according to claim [12] *1*, wherein main body has sides which overlap and extend along sides of said carrier link.

15. The wheel roller according to claim 14, wherein each of said sides of said main body has a front circular shaped reinforcement and a rear circular reinforcement, said front and rear circular shaped reinforcements have said openings running completely through said front and rear circular shaped reinforcements.

16. The wheel roller according to claim 15, wherein said front and rear circular shaped reinforcements are each directly disposed above one of said arms of said carrier link.

[17. The wheel roller according to claim 12, wherein said carrier link forging has a center of gravity disposed directly above said carrier link.]

*18. The wheel roller according to claim 1, wherein said wheels are supported by a single said main body.*

*19. The wheel roller according to claim 5, wherein said main body has a front end extending past said front end of said carrier link and a rear end extending past said rear end of said carrier link.*

*20. The wheel roller according to claim 6, wherein said openings run completely through said first and second reinforcements.*

*21. The wheel roller according to claim 5, wherein said carrier link is C-shaped with two opposing arms having a gap formed between said arms.*

*22. The wheel roller according to claim 9, wherein said wheels are disposed on opposing sides of said main body.*

*23. The wheel roller according to claim 10, wherein said pocket surrounds the adjacent carrier link on at least three sides.*

*24. The wheel roller according to claim 10, wherein said pocket surrounds the adjacent carrier link on at least four sides.*

*25. The wheel roller according to claim 10, wherein said legs have at least one section which is tapered.*

*26. The wheel roller according to claim 10, further comprising horizontal webs connected between one of said legs and said single main body, said horizontal webs spacing said legs from said single main body in a horizontal direction.*

* * * * *